United States Patent [19]

Allread et al.

[11] Patent Number: 5,048,873
[45] Date of Patent: Sep. 17, 1991

[54] DOUBLE BALL JOINT

[75] Inventors: Alan R. Allread; Gary B. Challender, both of Jackson, Mich.

[73] Assignee: Aero Quip Corporation, Jackson, Mich.

[21] Appl. No.: 489,149

[22] Filed: Mar. 5, 1990

[51] Int. Cl.$^5$ .............................................. F16L 27/04
[52] U.S. Cl. ..................................... 285/261; 285/93; 285/351
[58] Field of Search ............... 285/261, 269, 160, 169, 285/268, 93, 351

[56] References Cited

U.S. PATENT DOCUMENTS

| 1,402,545 | 1/1922 | Springborn | 285/268 X |
| 3,712,645 | 1/1973 | Herter | 285/351 X |

FOREIGN PATENT DOCUMENTS

| 2627375 | 12/1977 | Fed. Rep. of Germany | 285/261 |
| 215471 | 9/1941 | Switzerland | 285/261 |
| 331978 | 7/1930 | United Kingdom | 285/261 |

Primary Examiner—Dave W. Arola
Assistant Examiner—Heather Chun
Attorney, Agent, or Firm—Ralph J. Skinkiss; Duncan Beaman

[57] ABSTRACT

A ball joint assembly for interconnecting rigid conduits or ducts including spherical ball and socket elements in turn mounted in a housing for universal adjustment. The housing includes spherical segment support surfaces for engaging exterior spherical surfaces defined on the socket element to insure the range of adjustment. A spring member provides electrical continuity between the ball and socket elements comprising a bowed wire of an oblong configuration having an end attached to the ball element and resilient bows engaging the socket and ball elements such that as the elements are angularly displaced, the spring maintains a relatively constant spring load.

4 Claims, 1 Drawing Sheet

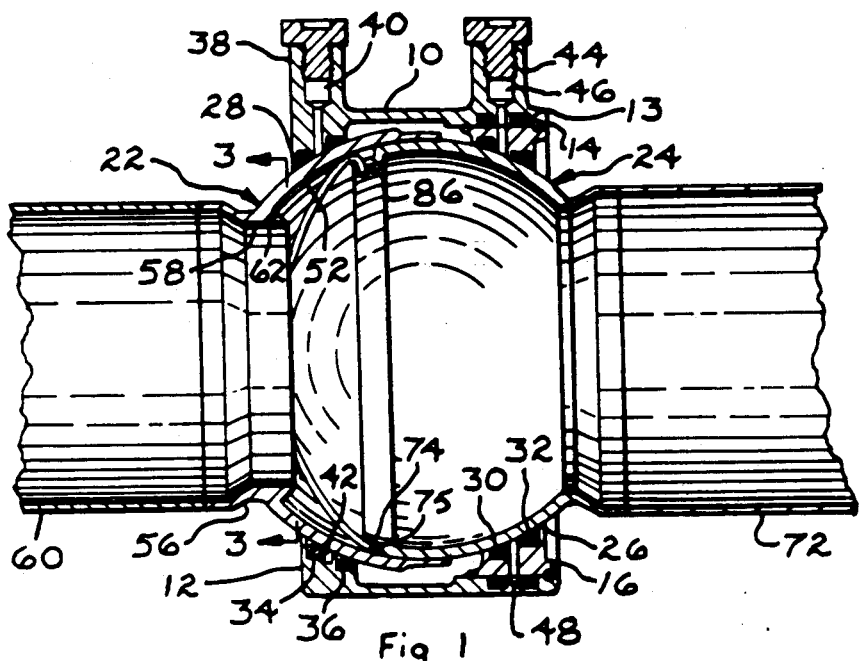
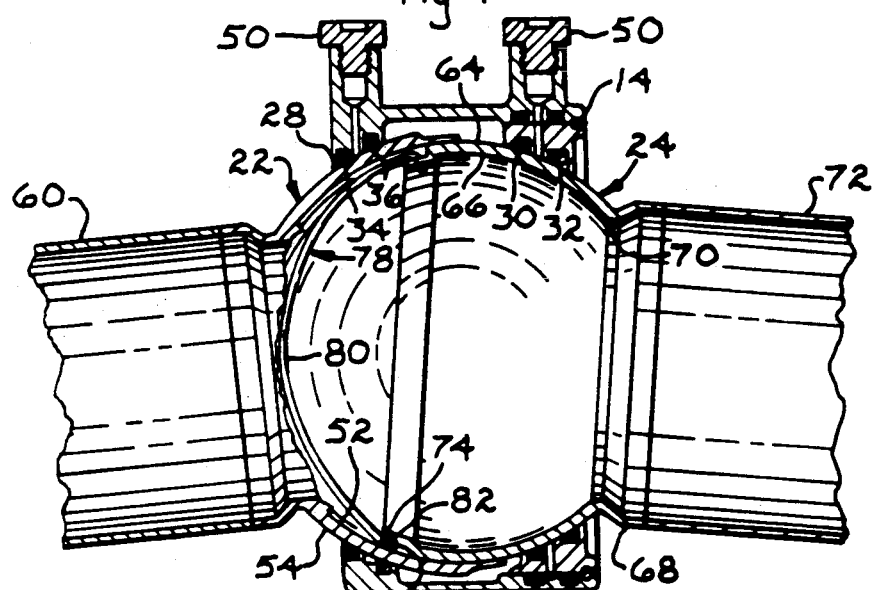
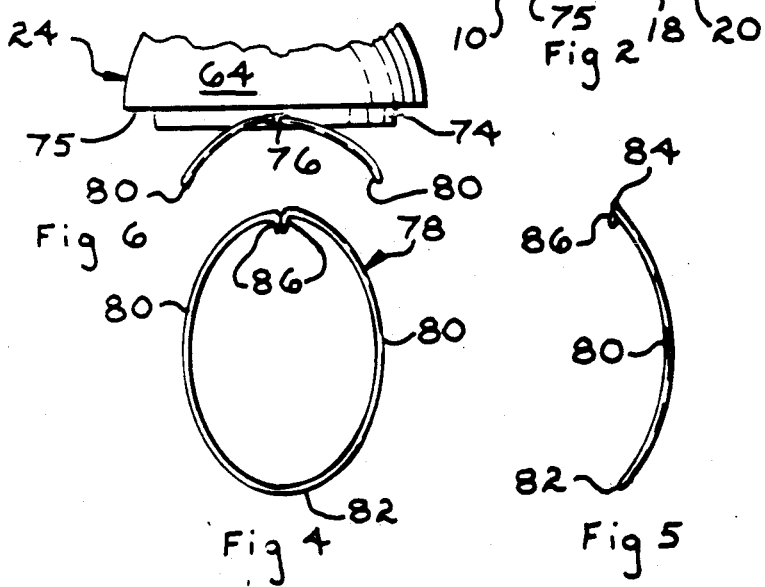
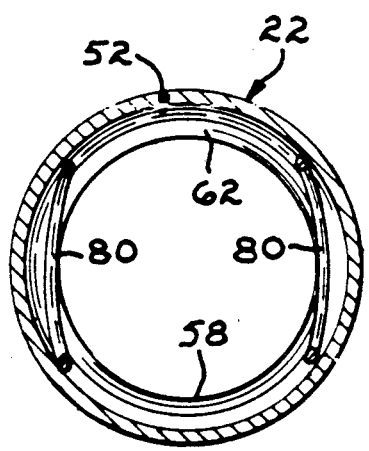

DOUBLE BALL JOINT

BACKGROUND OF THE INVENTION

Ball joints are commonly employed in rigid conduit or duct systems where it is desired that the systems have a degree of flexibility yet remain leak proof. Such joints consist of ball and socket elements each adapted to be connected to a conduit, and the ball element has a partial spherical end received within a corresponding spherical socket cavity defined in on end of the other element, thus permitting a degree of relative universal angular movement between the elements and the associated conduits. A spring member, usually in the form of a wave washer or a conical compression spring, is often interposed between the ball and socket elements to insure electrical continuity between the elements as they are angularly displaced to eliminate the potential build-up of static electricity.

While ball joints of this type incorporate a relatively simple construction and may be quickly and easily assembled, some deficiencies have been experienced. For instance, because the spring member compresses and expands as the elements are angularly displaced, a spring biasing force is applied to the elements tending to cause the elements to co-axially re-align which defeats the purpose of the ball joint. Also, because the axial length of the ball and socket spherical configurations must necessarily be limited to permit assembly, the angular adjustment of the associated conduits is relatively limited as a fluid-tight relationship between the elements must always be maintained.

It is an object of the invention to provide a ball joint for conduits including a pair of spherical elements pivotally mounted within a spherical segment cavity to form a "ball within a ball" relationship which permits twice the angular conduit deflection of a typical ball joint.

It is a further object of the invention to provide a ball joint for rigid conduit or duct systems consisting of a ball/socket element for one conduit having a partly spherical outer surface adapted to be pivotally received within a spherical cavity defined in a housing member and a spherical inner surface receiving a ball element of the other conduit whereby a "double" ball and socket relationship exists providing an increased range of conduit angular adjustment.

An additional object of the invention is to provide a ball joint for conduits consisting of an element having a partly spherical ball end adapted to be pivotally received within the partially spherical cavity of another element and a spring member maintaining electrical continuity between the elements is affixed to the ball element and is of such configuration that the spring member "rocks" when the ball joint is articulated providing a substantially constant spring load at all conduit angular positions.

Still another object of the invention is to provide a "double" ball joint including an outer housing having pressure ports defined thereon which allow the housing to be pressurized to check the condition of the primary seals.

In the practice of the invention the ball joint consists of a pair of elements each adapted to be connected to an end of a conduit. Both of the elements include a spherical segment outer surface and a spherical segment cavity, and one of the elements is adapted to be closely received within the spherical cavity of the other, thus permitting universal angular displacement between the associated conduits. The elements are encompassed by an annular housing which includes a pair of axially spaced and aligned spherical segment sealing surfaces adapted to pivotally receive one of the elements' outer spherical surface. Sealing rings located within annular grooves defined in the sealing surfaces establish a sealing engagement with the associated elements, outer spherical surface.

The housing is provided with pressure check ports having passages in communication with the interior of the housing and the sealing rings, and the ports are adapted to be connected to a pressurized test apparatus allowing the housing to be pressurized to check the condition of the sealing rings whereby if leakage occurs replacement of the sealing rings is indicated.

The mounting of a ball and socket joint within the housing such that the housing sealing surfaces engage the exterior of both the socket and ball permits the joint of the invention to be articulated to an extent twice that of a conventional conduit ball joint and yet a concise configuration can still be maintained.

A spring member formed of a wire element is interposed between the inner ball and socket elements to provide electrical continuity therebetween. The spring member is of an oblong bowed configuration including a pair of legs which have an arcuate configuration, and, preferably, the spring member is affixed to the inner ball element to maintain the spring position during assembly and use and as the inner ball and socket elements are angularly displaced the spring "rocks" providing a substantially constant spring load.

BRIEF DESCRIPTION OF THE DRAWINGS

The aforementioned objects and advantages of the invention will be appreciated from the following description and accompanying drawings wherein:

FIG. 1 is an elevational, diametrical sectional view of a ball joint assembly constructed in accord with the invention, FIG. 2 is a view similar to FIG. 1, illustrating the spherical elements, and conduits, angularly displaced with respect to one another and the housing, and omitting a portion of the internal shoulder for purpose of illustration, FIG. 3 is an elevational, sectional view taken along Section 3—3 of FIG. 1, FIG. 4 is an elevational view of the spring, per se, FIG. 5 is an elevational view of the spring of FIG. 4 as taken from the right thereof, and FIG. 6 is a top plan, partial, view of the inner ball element in accord with the invention illustrating the associated spring affixed thereto.

DESCRIPTION OF THE PREFERRED EMBODIMENT

The ball joint assembly in accord with the invention is disclosed in the drawing figures. The assembly includes a generally cylindrical annular housing 10 having a fixed end 12, and the other end of housing includes a bore 13 which includes an internal annular groove for receiving a drive wire 14 to retain an annular plate 16 within the bore 13. The exterior diameter of the plate 16 is sealed to the bore 13 of the housing 10 by a pair of sealing rings 18 and 20. A pair of spherical segment elements 22 and 24 are mounted within the housing, and each element is adapted to be connected to the end of a conduit employed in a ducting system, as later described.

The plate 16 is provided with an axial bore defining a spherical segment seat 26 which is axially spaced from, and aligns with a bore defined in the end 12 defining a spherical segment seat 28. The seats 26 and 28 pivotally support elements 24 and 22, respectively. The seat 26 employs a pair of seals 30 and 32 located within annular grooves while the seat 28 employs a pair of seals 34 and 36, and the seals establish a sealing engagement with the associated spherical element.

A pressure check port is defined at each end of the housing 10. The pressure port 38 has a passage 40 which intersects an annular groove 42 defined intermediate the seals 34 and 36. The pressure port 44 has a passage 46 which intersects an annular groove 48 defined in the plate 16 and housing 10 intermediate the seals 30 and 32. Caps 50 are threadedly mounted in each port, and upon removal of the caps, pressurized test apparatus, not shown, may be connected to the ports for pressurizing the housing to test the condition of all of the seals and 0-rings and the sealing relationship with the associated surfaces and spherical elements.

The element 22 has a spherical cavity 52 and an outer spherical surface 54 adapted to be received by the seat 28 in a sealing relationship with the seals 34 and 36 permitting the element a degree of relative universal angular movement with respect to the housing 10 but preventing axial separation therefrom. The element 22 also includes an extension 56 having an axial passage 58 intersecting the cavity 52 adapted to be connected to a conduit 60. An internal concentric annular shoulder 62 is defined upon the element 22 adjacent the intersection of the passage 58 and cavity 52.

The element 24 includes a spherical outer surface 64, a spherical cavity 66, and an extension 68 having a passage 70 intersecting the cavity 66. The extension 68 is adapted to be connected to a conduit 72, and the outer surface 64 is received by the seat 26 in a sealing relationship with the seals 30 and 32. A circumferential step 74 is defined adjacent the open end of the cavity 66 adjacent a transverse annular abutment edge 75, and the step 74 is provided with a slot 76 extending therethrough. The outer dimension of the element 24 is slightly less than the dimension of the spherical cavity 52 of the element 22 whereby the element 24 is closely received by the element 22 so as to form a "ball and socket" type joint. Thus, the segments 22 and 24, and the associated conduits, have universal relative angular displacement with respect to each other.

The fact that the element 22 is received within the spherical seat 28, and the element 24 within the seat 26, for respective universal pivotal movement also produces a "ball and socket" relationship between these respective components and this "double" ball and socket arrangement wherein a "ball is within a ball" provides twice the angular deflection of a typical ball joint wherein a housing 10 is not present.

As the maximum diameter of the element 22 is less than the diameter of the bore 13, and as the effective diameter of the spherical seats 26 and 28 are less than the maximum diameter of elements 24 and 22, respectively, the components of the ball joint may be readily assembled as illustrated by use of the plate 16 and drive wire 14. Of course it will be understood that the seats 26 and 28 and the surfaces 52, 54 and 64 are concentric having the same center of generation. Also, the diameter of the spherical seats 26 and 28 are preferably equal such that seals 30 and 36, and 32 and 34, respectively, are the same to reduce inventory and simplify assembly.

A spring member 78 interposed between the elements 22 and 24 provides electrical continuity between the elements as the elements are angularly displaced to eliminate the potential build-up of static electricity. The spring member 78 is formed of a single wire element into an oblong configuration including a pair of arcuate leg portions 80 extending from the bottom end 82 an terminating adjacent one another at the top end 84 At the top end 84, the legs are bent inwardly to form tips 86 which are adapted to be received in the slot 76 of the element 24, as best appreciated in FIG. 6, while the end 82 is supported between the step 74 and the cavity 52 and engages the abutment edge 75, FIGS. 1 and 2. The legs 80 conform to the spherical cavity 52 of the element 22, and as will be best appreciated in FIG. 3, the legs 80 straddle and engage the annular shoulder 62.

As the elements 22 and 24 are angularly displaced with respect to each other and the housing 10, the spring 78 moves with the element 24 and "rocks" relative to the element 22 maintaining engagement therewith without causing the spring to significantly compress or expand so that no significant change in the spring force is applied to the elements. The shoulder 62 prevents the spring legs 80 from crossing the intersection of the cavity 52 and passage 58.

Because the spring 78 maintains a relatively constant configuration as the elements 22 and 24 are angularly displaced, no significant forces are created which would tend to bias the elements to the axial aligned position of FIG. 1. Also, since the spring 78 maintains a relatively constant force, the diameter of the wire with which the spring is formed may be relatively small which provides a light weight spring which is inexpensive to manufacture, easy to install, and requires little room when assembled.

In appreciating the invention it will be understood that the limitations to relative pivoting of the pair of elements 22 and 24 is due to the axial length of the spherical surfaces 64 and 52. These surfaces have a limited axial length in order to permit the elements 22 and 24 to be assembled, i.e. the axial length of the spherical surfaces cannot be greater than $\frac{1}{2}$ the diameter of the surface. To achieve significant increased conduit deflection the axial spacing of the seats 26 and 28 must be as great as possible as determined by the amount of conduit deflection desired. If the seats 26 and 28 are too widely separated they will interfere with conduit pivoting, but if they are too close together little advantage will be achieved.

It is to be appreciated that various modifications to the inventive concepts may be apparent to those skilled in the art without departing from the spirit and scope of the invention.

We claim:

1. A ball joint assembly for connecting a pair of conduits in a fluid tight relationship and permitting relative angular displacement therebetween comprising, in combination, an inner angular element in communication with a first conduit having a first outer partial convex spherical surface, an outer annular element in communication with a second conduit having a second inner partial concave spherical surface closely rotatably concentrically receiving said first surface and a third outer partial convex spherical surface concentric to said second surface, an annular housing having an axis, fourth and fifth partial concave spherical surfaces defined on said housing concentric to said axis and axially spaced relative to each other, said fifth surface engaging said first surface, said fourth surface engaging said third surface and all of said partial spherical surfaces being concentric whereby said inner and outer elements universally pivot relative to each other and said first and fifth surfaces and said third and fourth surfaces, respectively, universally pivot relative to each other, a spring member interposed between said elements in electrical contact therewith providing electrical continuity between said elements and conduits at all angular orientations thereof.

2. In a ball joint assembly as in claim 1, said spring member being formed of a wire element having an axis and an oblong configuration having curved ends, said wire element including a pair of legs extending from one curved end and terminating adjacent each other at the other curved end, said legs being arcuately bowed in a common axial direction, said curved ends engaging one of said elements and said legs engaging the other of said elements.

3. In a ball joint assembly as in claim 3, said inner element having a circumferential step defined adjacent said outer element, an annular space defined between said step and said outer element, a slot defined in said step, said spring legs being bent inwardly defining tips, said tips being received in said slot.

4. In a ball joint assembly having a first element having a partial spherical cavity defined therein and adapted to be connected to a conduit, a second element having an end adapted to be connected to a conduit and a partial spherical end received in the first element's spherical cavity permitting relative angular displacement between the conduits, and an annular spring interposed between the first and second elements providing electrical continuity between the elements, the improvement comprising, the spring being formed of a single wire element into a relatively oblong configuration having curved ends and including a pair of homogenous arcuate legs extending from one curved end and terminating adjacent one another at the other curved end, said legs engaging a portion of the first elements spherical cavity and said curved ends engage a portion of the second element adjacent its spherical surface, said spring maintaining a relatively constant configuration as the elements are angularly displaced with respect to each other.

* * * * *